May 6, 1969 R. R. SHELLMAN ET AL 3,442,009
METHOD OF BRAZING ALUMINUM TO FERROUS METAL
Filed Oct. 22, 1965

INVENTOR.
ROBERT R. SHELLMAN
HOWARD W. CRUSEY
BY
James P. Malone

United States Patent Office 3,442,009
Patented May 6, 1969

3,442,009
METHOD OF BRAZING ALUMINUM TO FERROUS METAL
Robert R. Shellman, Northport, and Howard W. Crusey, Huntington, N.Y., assignors, by direct and mesne assignments of forty percent each to Robert R. Shellman, Northport, and forty percent to Filomena Monaco, Curlstadt, N.J., and twenty percent to Howard W. Crusey, Huntington, N.Y.
Filed Oct. 22, 1965, Ser. No. 500,621
Int. Cl. B23k 31/02, 1/20, 35/12
U.S. Cl. 29—482
5 Claims

ABSTRACT OF THE DISCLOSURE

A method of brazing aluminum to ferrous metals. The parts are tapered to provide a predetermined end clearance at room temperature. More specifically, the ferrous piece is tapered and coated with aluminum and is inserted into the aluminum piece which has the same angle of taper as the coated ferrous piece. The room temperature clearance is calculated so that there will be proper fit and clearance at brazing temperature for the brazing alloy.

---

This invention relates to methods for brazing aluminum primarily to ferrous metals for instance, for making connections between aluminum and ferrous cylinders and flat pieces.

The present method can also be used for brazing aluminum to other materials for instance, titanium, nickel, nickel alloys and possibly others.

This method is an improvement over Patent No. 3,205,573 granted Sept. 14, 1965 of the same title.

In the method of the patent, the ferrous piece is knurled and then grit blasted and stainless steel bands are used to prevent overexpansion.

The present invention eliminates the above steps of knurling, blast cleaning and the use of steel bands.

In the method of the present invention, the parts are tapered to provide a predetermined end clearance at room temperature. More specifically, the ferrous piece is tapered and coated with aluminum and is inserted into the aluminum piece which has the same angle of taper as the coated ferrous piece. The room temperature clearance is calculated so that there will be proper fit and clearance at brazing temperature for the brazing alloy.

Accordingly, a principal object of the invention is to provide new and improved methods for brazing aluminum to other metals including for instance ferrous alloys, titanium, nickel and their alloys.

Another object of the invention is to provide new and improved methods for brazing aluminum cylinders to ferrous cylinders.

Another object of the invention is to provide new and improved methods for brazing aluminum cylinders to cylinders of a second metal including the technique of tapering said cylinder at the same angle of taper with a predetermined end clearance between the outer aluminum cylinder and the inner cylinder so that at brazing temperature there is only sufficient clearance for the brazing alloy.

Another object of the invention is to provide new and improved methods of brazing a piece of aluminum or an alloy composed largely of aluminum to a piece of a second metal which comprises, tapering the second piece, coating said tapered portion plus an extending margin of the second metal piece with molten metal composed largely of aluminum, tapering the aluminum piece to provide a predetermined end clearance at brazing temperature, mating the portions of both pieces to be joined together, applying a brazing alloy to the mated joint, preheating the mated combination to approximately 900° F.– 1100° F. and inserting the mated combination in a flux bath having a temperature above the melting point of the brazing alloy and below the melting points of the metal pieces for a period of time sufficient to melt and flow the brazing alloy.

These and other objects of the invention will be apparent from the following specification and drawings of which:

Referring to the figures, a ferrous cylinder 1 and an aluminum cylinder 2 are machined with the same angle of taper $a$. The parts are machined so that the end clearance A-C is a predetermined amount at room temperature which is calculated to give the desired clearance at brazing temperature.

Figure 1:
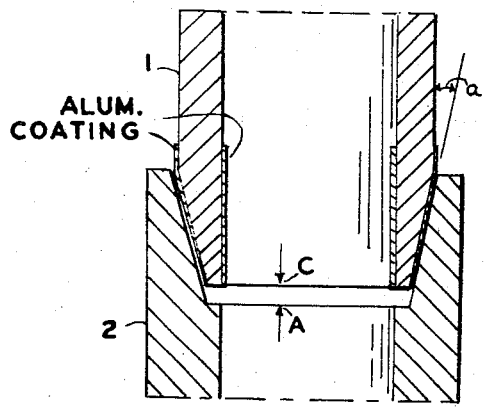
FIGURE 1 is a diagram illustrating an example of the method at room temperature.
Figure 2:
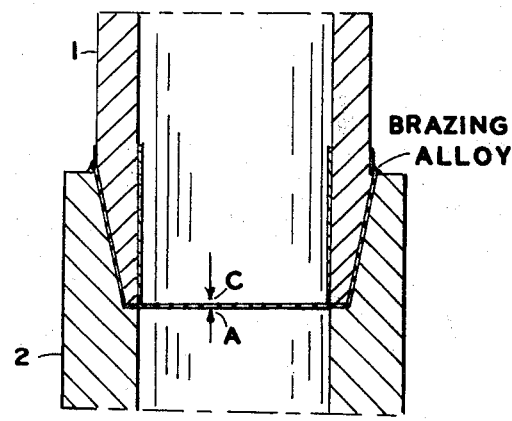
FIGURE 2 illustrates the example of FIGURE 1 at brazing temperature.

FIGURE 2 illustrates the same parts as FIGURE 1 at brazing temperature. Note that the distance A-C has decreased to a very small dimension of the order of a few thousandths of an inch, which is sufficient to permit the application of brazing alloy. This operation is possible because the aluminum expands at a greater rate than the ferrous material. For instance, for type 6061 aluminum and type 304 stainless steel the relation is that the aluminum expands approximately .0054 inch per inch of diameter more than the ferrous material from room temperature to brazing temperature.

Therefore, after the parts have been brazed and cooled the aluminum piece is bonded to the ferrous piece. This is due to the proper and uniform clearance at brazing temperature which is made possible by the tapered fit. This eliminates trapping of flux which the presence of which prevents complete bonding and causes etching and corrosion.

Typical corresponding relative expansion figures for other metals are as follows:

Carbon steel ............................................. .0075
300 series stainless steel ........................... .010
400 series stainless steel ........................... .0064
Titanium .................................................. .0054
Nickel ..................................................... .008
Aluminum type EC–1100 ........................... .0155
Aluminum type EC–3003 ........................... .0152
Aluminum type EC–5086 ........................... .0147
Aluminum type EC–6061 ........................... .0154

In discussing the process, specific reference is made to aluminum and ferrous metal. It is intended that this terminology include the other metals mentioned and equivalents. More specifically, the method is as follows:

(1) The ferrous piece is tapered.

(2) The parts are chemically cleaned for instance with a nitric acid solution.

(3) Both inside and outside surfaces of the ferrous piece are masked at room temperature, for instance with a graphite suspension so that tapered portion plus an extending margin approximately equal to the length of the taper remains unmasked. The masking material may be a colloidal suspension of graphite such as that which is commonly known as Dixonac #10.

(4) The steel or ferrous piece is then dipped in molten aluminum to provide a coating on the tapered and unmasked margin of the ferrous piece.

(5) The coated surface is tested with a wire scraper to make sure the part is completely coated.

(6) The aluminum piece is machined with the same angle of taper and with dimensions to provide an end clearance which is calculated to give the desired braze clearance at braze temperature. The method of calculation will be discussed hereafter.

(7) The coated surface is chemically cleaned for instance, with a caustic solution.

(8) The tapered parts are then positioned together and the brazing alloy is applied. It may be Handy & Harmon Alumibraze, Alcoa No. 718 shim stock, Alcoa No. 716.

(9) Preheat at approximately 900° F.–1100° F.

(10) The mated parts are then placed in a flux bath having a temperature above the melting temperature of the brazing alloy but below the melting temperature of the brazing parts for instance, of the order of 980° F. to 1190° F. The flux bath may be Park Chemical "D" salt, Alcoa No. 34 or similar material.

(11) The mated parts are removed and may be pushed together if necessary for proper mating before the brazing alloy has solidified. A fixture or jig may be used for this purpose.

(12) The parts are then immersed in hot water to remove excess flux.

(13) The mated parts are then chemically cleaned in a solution such as described above in step No. 2.

(14) The parts may then further be cleaned in dilute chromic acid solution and rinsed in water and may be scrubbed in a detergent solution and dried.

Figure 3:
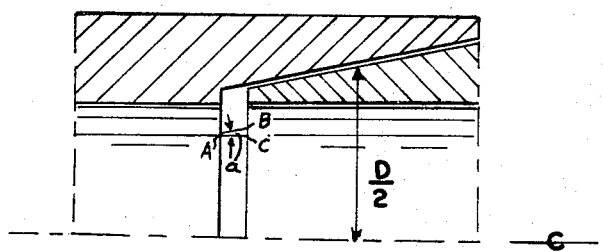
FIGURE 3 illustrates the operation and theory of the invention.

FIGURE 3 shows the calculation of the clearance parameters.

This is based on the differential expansion factor from room to brazing temperature namely, the differential expansion between type 6061 aluminum and type 304 stainless steel is .0054 in./in. of diameter.

$$AC = BC \cot a$$

Where $AC$ = desired room temperature end clearance for substantially zero clearance at brazing temperature.

$$BC = dT \frac{\text{Diam.}}{2}$$

Where Diam. is average diameter, and
Where $dT = .0054$ in./in. of Diam. for Al/Ferrous differential expansion
Therefore $$AC = .0054 \frac{\text{Diam.}}{2} (\cot a)$$

Assume Diam. = 2″
Then $AC = .0054 \cot a$

A taper $a$ of 5° would give $AC = .0054 (11.4) = .0615″$.

Therefore, if the parts are machined, for an end clearance of .0615″ at room temperature, they will have the desired nesting relation for brazing.

Figure 4:
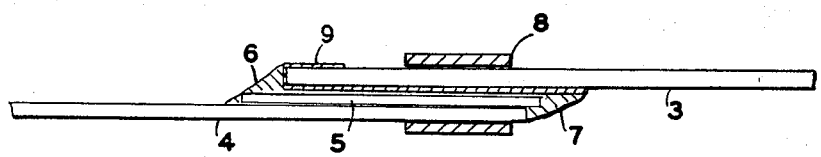
FIGURE 4 illustrates a modification of the invention.

Flat ferrous, nickel or titanium alloy metal pieces can be bonded to flat aluminum or aluminum alloy pieces by our process using the following procedure as illustrated in FIGURE 4.

(1) Clean the ferrous, nickel or titanium alloy member 3 with a nitric acid solution, hereafter called "ferrous" member.

(2) Mask the ferrous member as in the previously described process and apply aluminum coating 9.

(3) Clean the aluminum member 4.

(4) Assemble the aluminum coated ferrous member against the aluminum member with an intermediate strip of silicon-aluminum brazing shim 5 approximately .003″–.012″ thick. The braze alloy may be Alcoa No. 713 or No. 718 or equivalent. The aluminum member may be clad with brazing alloy such as No. 11, No. 21, etc. Hold assembly together with Inconel "X" clip 8.

(5) The edges of the two members are each coated with a slurry 6 and 7 of braze alloy such as Handy and Harmon Alumibraze or similar materials.

(6) Preheat at 900° F.–1100° F.

(7) Place in flux bath having a temperature above the melting temperature of the brazing alloy but below the melting temperature of the brazing parts for instance, of the order of 980° F.–1190° F. The flux bath may be Park Chemical "D" salt, Alcoa No. 34 or similar material.

(8) Remove from bath and wash in hot water.

Many modifications may be made by those who desire to practice the invention without departing from the scope thereof which is defined by the following claims.

We claim:

1. The method of brazing a piece of aluminum or an alloy composed largely of aluminum to a piece of ferrous metal which comprises, tapering the ferrous piece for a distance substantially longer than the wall thickness, coating said tapered position of ferrous metal piece with molten metal composed largely of aluminum, tapering said aluminum piece to substantially the same degree of taper as that of said ferrous piece to provide a predetermined end clearance with said ferrous metal piece at brazing temperature, and so that said ferrous piece will seat in said aluminum piece upon complete expansion of said aluminum and ferrous pieces to provide proper clearance for braze material, mating the portions of both pieces to be joined together and holding them in a fixture in the mated position, applying a brazing alloy to the mated joint, and inserting the fixture and the mated combination in a flux bath having a temperature above the melting point of the brazing alloy and below the melting points of the metal pieces for a period of time sufficient to melt and flow the brazing alloy along the mating surface.

2. The method of brazing a piece of aluminum or an alloy composed largely of aluminum to a piece of ferrous metal which comprises, tapering the ferrous piece, coating said ferrous metal piece with molten metal composed largely of aluminum, tapering the aluminum piece to substantially the same degree of taper as that of said ferrous piece to provide an end clearance at room temperature with said ferrous metal piece according to the formula, $$\text{End clearance} = KD \cot a$$

where $K$ is the differential coefficient of expansion of said pieces, where $D$ is the average diameter and $a$ is the angle of taper, and so that said ferrous piece will seat in said aluminum piece upon complete expansion of said aluminum and ferrous pieces to provide proper clearance for braze material, mating the portions of both pieces to be joined together and holding them in a fixture in the mated position, applying a brazing alloy to the mated joint, and inserting the fixture and the mated combination in a flux bath having a temperature above the melting point of the brazing alloy and below the melting points of the metal pieces for a period of time sufficient to melt and flow the brazing alloy.

3. The method of brazing an aluminum or an aluminum alloy cylinder to a ferrous metal cylinder comprising the steps of, tapering the ferrous piece for a distance substantially longer than the wall thickness, chemically cleaning said pieces, masking the untapered portion of said ferrous cylinder at room temperature, coating said tapered portion of said ferrous cylinder with aluminum, tapering said aluminum piece to substantially the same degree of taper as that of said ferrous piece so that said ferrous cylinder fits inside said aluminum cylinder with the same angle of taper but with a predetermined end clearance at room temperature, and so that said ferrous piece will seat in said aluminum piece upon complete expansion of said aluminum and ferrous pieces to provide proper clearance for braze material, mating said pieces, applying brazing alloy to said mated pieces, heating said mated pieces to brazing temperature, pushing said pieces together before brazing alloy solidifies, cleaning in hot water, immersing in a solution of nitric acid.

4. The method of brazing a piece of aluminum or an alloy composed largely of aluminum to a piece of ferrous metal which comprises, tapering the ferrous piece for a distance substantially longer than the wall thickness, coating said tapered positions of ferrous metal piece with molten metal composed largely of aluminum, tapering said aluminum piece to substantially the same degree of taper as that of said ferrous piece to provide a predetermined end clearance at ambient temperature, and so that said ferrous piece will seat in said aluminum piece upon complete expansion of said aluminum and ferrous pieces to provide proper clearance for braze material, mating the portions of both pieces to be joined together, applying a brazing alloy to the mated joint, and heating the mated combination at a temperature above the melting point of the brazing alloy and below the melting points of the metal pieces for a period of time sufficient to melt and flow the brazing alloy.

5. The method of brazing a piece of aluminum or an alloy composed largely of aluminum to a piece of ferrous metal which comprises, tapering said ferrous piece for a distance substantially longer than the wall thickness, coating said tapered position of ferrous metal piece with molten metal composed largely of aluminum, tapering the aluminum piece to substantially the same degree of taper as that of said ferrous pieces to provide a predetermined end clearance at ambient temperature, such that due to differential expansion the pieces will nest at brazing temperature with proper clearance for said brazing alloy, and so that said ferrous piece will seat in said aluminum piece upon complete expansion of said aluminum and ferrous pieces to provide proper clearance for braze material, mating the portions of both pieces to be jointed together, applying a brazing alloy to the mated joint, and heating the mated combination at a temperature above the melting point of the brazing alloy and below the melting points of the metal pieces for a period of time sufficient to melt the brazing alloy.

References Cited

UNITED STATES PATENTS

| | | | |
|---|---|---|---|
| 1,066,290 | 7/1913 | Kraus | 29—504 X |
| 2,338,277 | 1/1944 | Ashby | 29—502 X |
| 2,769,231 | 11/1956 | Grenell | 29—471.7 |
| 2,837,818 | 6/1958 | Storchheim | 29—504 X |
| 2,965,963 | 12/1960 | Batz et al. | 29—488 X |
| 3,010,198 | 11/1961 | Hannik et al. | 29—488 X |
| 3,032,870 | 5/1962 | Rohrberg et al. | 29—482 X |
| 3,205,573 | 9/1965 | Seal et al. | 29—482 X |
| 3,213,532 | 10/1965 | Glaser et al. | 29—504 X |

WILLIAM I. BROOKS, *Primary Examiner.*

J. L. CLINE, *Assistant Examiner.*

U.S. Cl. X.R.

29—483, 501